United States Patent [19]
Werner et al.

[11] Patent Number: 6,069,917
[45] Date of Patent: May 30, 2000

[54] BLIND TRAINING OF A DECISION FEEDBACK EQUALIZER

[75] Inventors: Jean-Jacques Werner, Holmdel; Jian Yang, Ocean, both of N.J.

[73] Assignee: Lucent Technologies Inc., Murray Hill, N.J.

[21] Appl. No.: 08/862,909

[22] Filed: May 23, 1997

[51] Int. Cl.[7] .................................................. H03H 7/40
[52] U.S. Cl. .......................... 375/233; 375/232; 708/323
[58] Field of Search ................................... 375/229, 232, 375/233, 321, 230, 234; 364/724.19; 607/17; 708/322, 323

[56] References Cited

U.S. PATENT DOCUMENTS

| | | | |
|---|---|---|---|
| 4,227,152 | 10/1980 | Godard et al. | 375/13 |
| 5,282,155 | 1/1994 | Jones | 364/724.19 |
| 5,539,774 | 7/1996 | Nobakht et al. | 375/232 |
| 5,562,711 | 10/1996 | Yerich et al. | 607/17 |
| 5,712,873 | 1/1998 | Shiue et al. | 375/233 |
| 5,799,037 | 8/1998 | Strolle et al. | 375/321 |
| 5,970,093 | 10/1999 | De Lantremange | 375/234 |

OTHER PUBLICATIONS

Y. Sato, "A Method of Self–Recovering Equalization for Multilevel Amplitude–Modulation Systems," IEEE Trans. Commun., pp. 679–682, Jun. 1975.

A. Benveniste and M. Goursat, "Blind Equalizers," IEEE Trans. Commun., vol. 32, No. 8, pp. 871–883, 1984.

N. K. Jablon, "Joint Blind Equalization, Carrier Recovery, and Timing Recovery for High–Order QAM Signal Constellations," IEEE Trans. Signal Processing, vol. 40, No. 6, pp. 1383–1897, 1992.

S. Chen, S. McLaughlin, P. M. Grant and B. Mulgrew, "Multi–Stage Blind Clustering Equaliser," IEEE Trans. Commun., vol. 43, No. 2/3/4, pp. 701–705, Feb./Mar./Apr. 1995.

J. K. Tugnait, "Blind Equalization and Estimation of Digital Communication FIR Channels Using Cumulant Matching," IEEE Trans. Commun., vol. 43, No. 2/3/4 pp. 1240–1245, Feb./Mar./Apr. 1995.

J. J. Werner, "Tutorial on Carrierless AM/PM—Part I—Fundamentals and Digital CAP Transmitter," Contribution to ANSIX3T9.5 TP/PMD Working Group, Minneapolis, Jun. 23, 1992.

Dale Harman, et al., Contribution to T1 Standards Project for VDSL, "Steady–State Peformance and Blind Training of a DFE in the Presence of RF Interface," T1E1.4 Technical Subcommittee, Feb. 3–7, 1997, Austin.

Kil Nam Oh and Yong Ohk Chin, "New Blind Equalization Techniques Based on Constant Modulus Algorithm," IEEE, 1995, pp. 865–869.

D. N. Godard, "Self–Recovering Equalization and Carrier Tracking in Two–Dimensional Data Communications Systens," IEEE, Trans. Commun., vol. 28, No. 11, pp. 1867–1875, Nov. 1980.

*Primary Examiner*—Stephen Chin
*Assistant Examiner*—Chieh M. Fan
*Attorney, Agent, or Firm*—J. J. Opalach

[57] ABSTRACT

A decision feedback equalizer (DFE) comprises a feed-forward filter and a feedback filter. Blind training of the DFE is performed using a statistical-based tap updating algorithm for the feed-forward filter, and a symbol-based type of tap updating algorithm for the feedback filter.

19 Claims, 9 Drawing Sheets

100

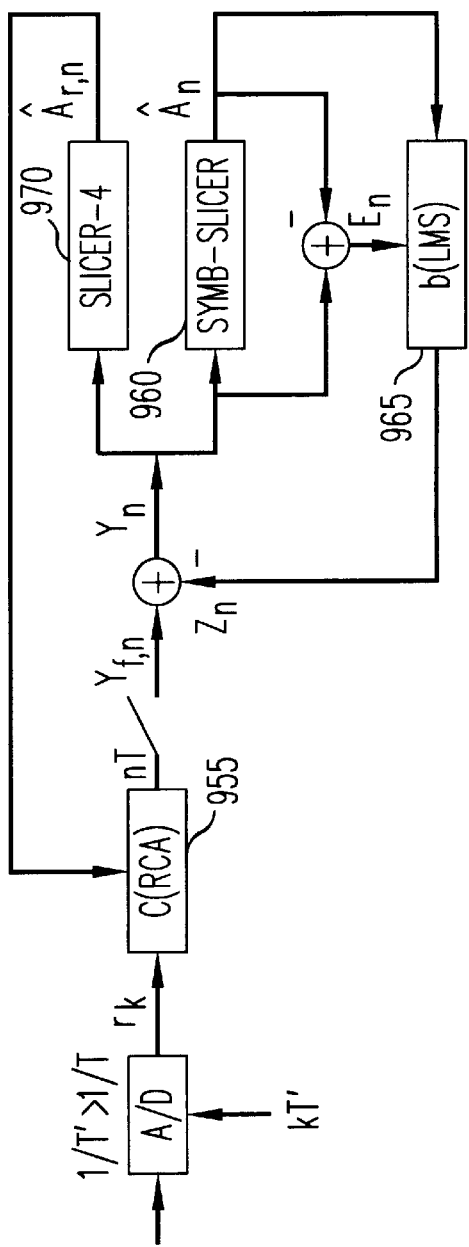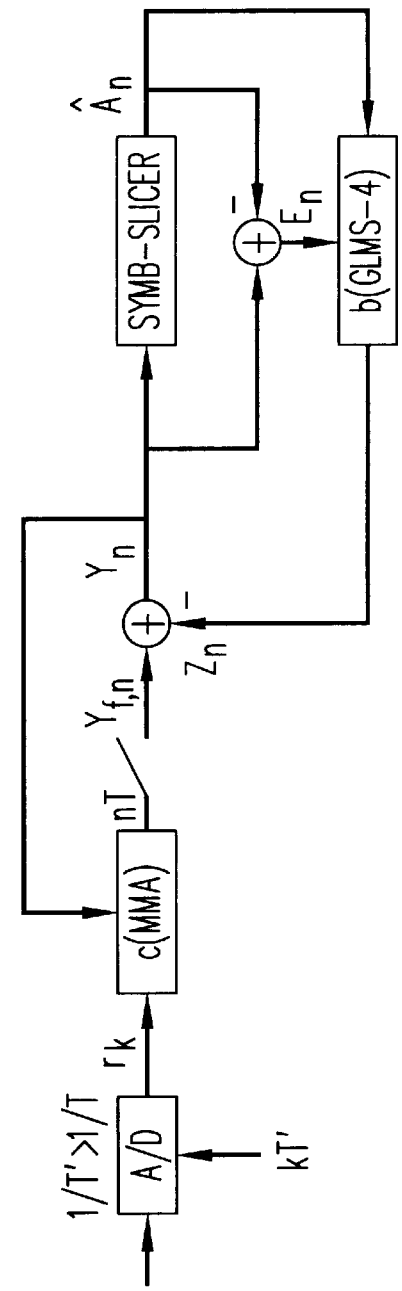

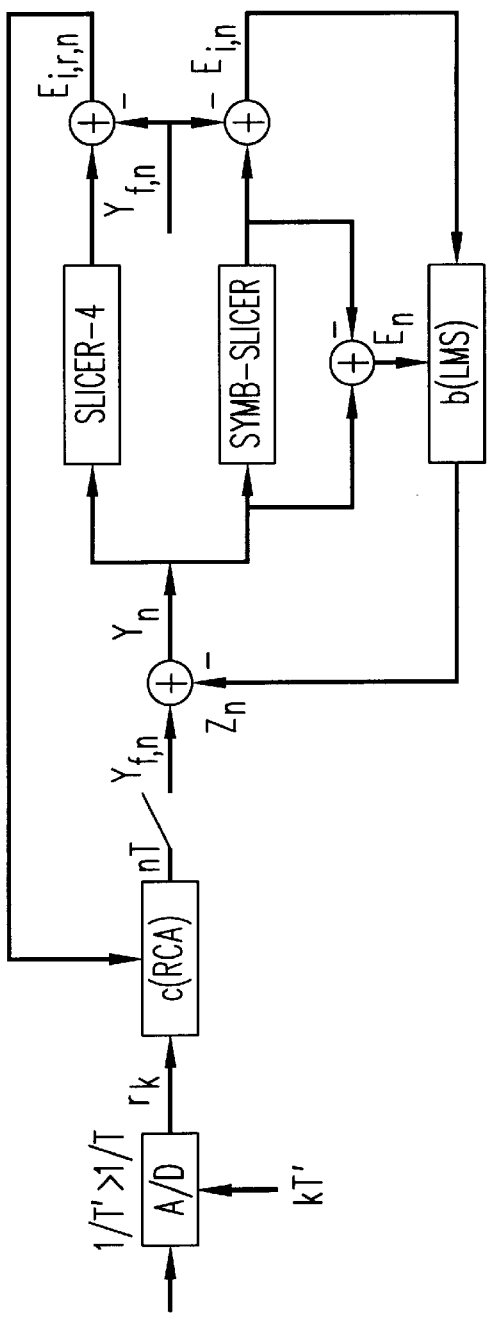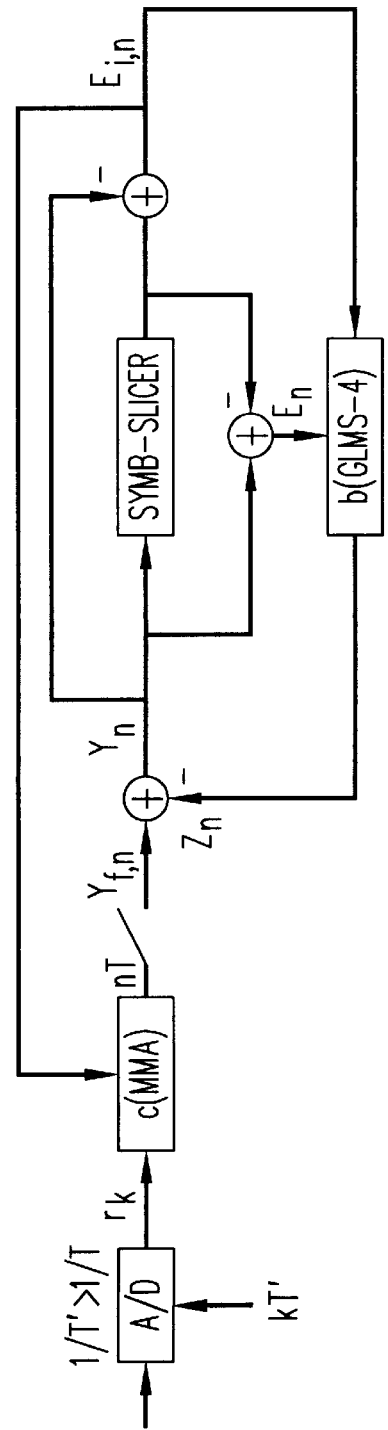

BLIND TRAINING OF A DECISION FEEDBACK EQUALIZER

CROSS-REFERENCE TO RELATED APPLICATIONS

Related subject matter is disclosed in the following co-pending, commonly assigned, U.S. Patent applications of Werner et al.: Ser. No. 08/646404, filed on May 7, 1996; Ser. No. 08/717582, filed on Sep. 18, 1996; Ser. No. 08/744908, filed on Nov. 8, 1996; Ser. No. 08/757207, filed on Nov. 27, 1996; and Ser. No. 08/766406, filed on Dec. 12, 1996.

BACKGROUND OF THE INVENTION

The present invention relates to communications equipment, and, more particularly, to blind equalization in a receiver having a decision feedback equalizer (DFE).

In blind equalization, the linear equalizer of a receiver is converged without the use of a training signal. As known in the art, there are two techniques for blind equalization: one is referred to herein as the "reduced constellation algorithm" (RCA) (e.g., see Y. Sato, "A Method of Self-Recovering Equalization for Multilevel Amplitude-Modulation Systems," *IEEE Trans. Commun.*, pp. 679–682, June 1975; and U.S. Pat. No. 4,227,152, issued Oct. 7, 1980 to Godard); and the other technique is the so-called "constant modulus algorithm" (CMA) (e.g., see D. N. Godard, "Self-Recovering Equalization and Carrier Tracking in Two-Dimensional Data Communications Systems," *IEEE Trans. Commun.*, vol. 28, no. 11, pp. 1867–1875, Nov. 1980; and N. K. Jablon, "Joint Blind Equalization, Carrier Recovery, and Timing Recovery for High-Order QAM Signal Constellations", *IEEE Trans. Signal Processing*, vol. 40, no. 6, pp. 1383–1398, 1992.) Further, the co-pending, commonly assigned, U.S. Patent application of Werner et al., entitled "Blind Equalization," Ser. No. 08/646404, filed on May 7, 1996, presents a new blind equalization technique—the multimodulus algorithm (MMA)—as an alternative to the above-mentioned RCA and CMA approaches.

However, in applications where the dominant noise includes one or several radio frequency (RF) interferers, a linear equalizer alone is not able to provide good performance. In such applications, it is desirable to use a decision feedback equalizer (DFE). A DFE comprises a feed-forward portion and a feedback portion. The latter is used to correct postcursor interference.

Unfortunately the above-described approaches to blind equalization are not well-suited to the blind equalization of a DFE.

SUMMARY OF THE INVENTION

We have realized that the key to blindly converge a DFE is to use different types of tap updating algorithms for the feed-forward and feedback portions. In particular, the above-mentioned blind equalization techniques reduce the probability of error in a statistical sense. However, a DFE requires the actual, and hopefully correct, symbols to be fed back to the feedback portion of the DFE in order to correct the postcursor interference. If the correct symbols are not fed back to the feedback filter, then error propagation occurs and both the feed-forward and feedback filter will not converge properly. Therefore, and in accordance with the inventive concept, a statistical-based tap updating technique is applied to the feed-forward portion and a symbol-based tap updating technique is applied to the feed-back portion.

In an embodiment of the invention, a DFE comprises a feed-forward filter and a feed-back filter. An RCA tap updating algorithm is used to blindly converge the feed-forward filter and a symbol-sliced least mean squared (LMS) tap updating algorithm is used to converge the feed-back filter.

In another embodiment of the invention, a DFE comprises a feed-forward filter and a feed-back filter. An MMA tap updating algorithm is used to blindly converge the feed-forward filter and a generalized LMS tap updating algorithm is used to converge the feed-back filter.

BRIEF DESCRIPTION OF THE DRAWING

FIGS. 7–10 show illustrative embodiments in accordance with the principles of the invention;

FIGS. 12–13 show other illustrative embodiments in accordance with the principles of the invention for use with an NPDFE-type equalizer.

DETAILED DESCRIPTION

Before describing the inventive concept, some background information is presented on decision feedback equalizers (DFEs). Also, generally speaking, equalizers operate in two modes—a training mode and a steady-state mode. During steady state, the LMS algorithm is typically used. During training, there can either be a training signal or training can be performed blind. The description below relates to blind training of a DFE.

Decision Feedback Equalizers

Figure 1:
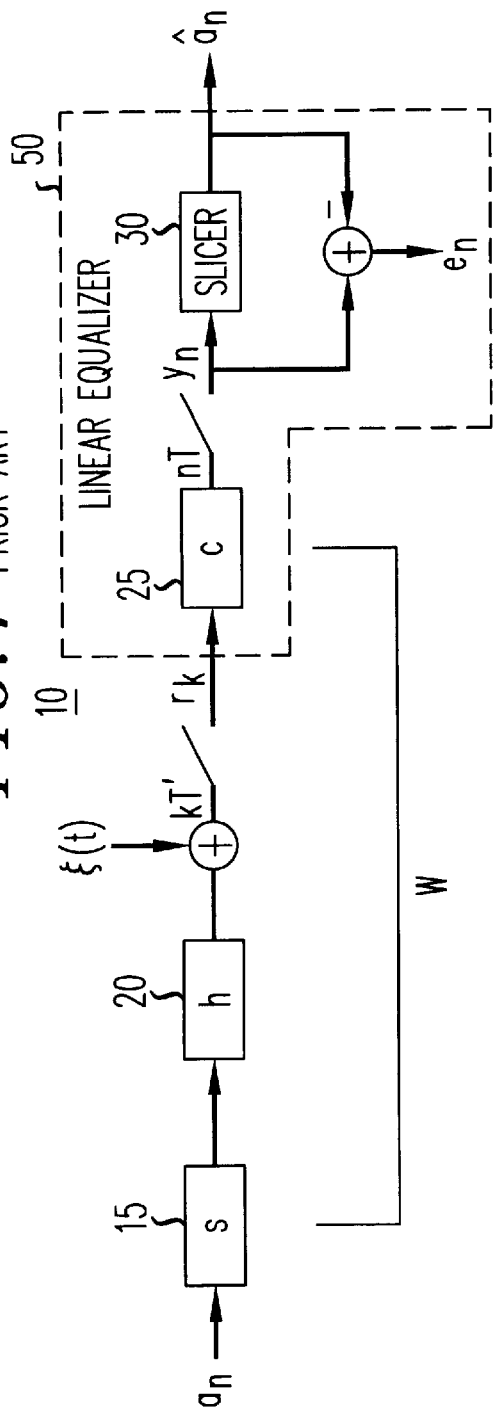
FIG. 1 is an illustrative block diagram of a prior art communications system using a linear equalizer.
Figure 2:
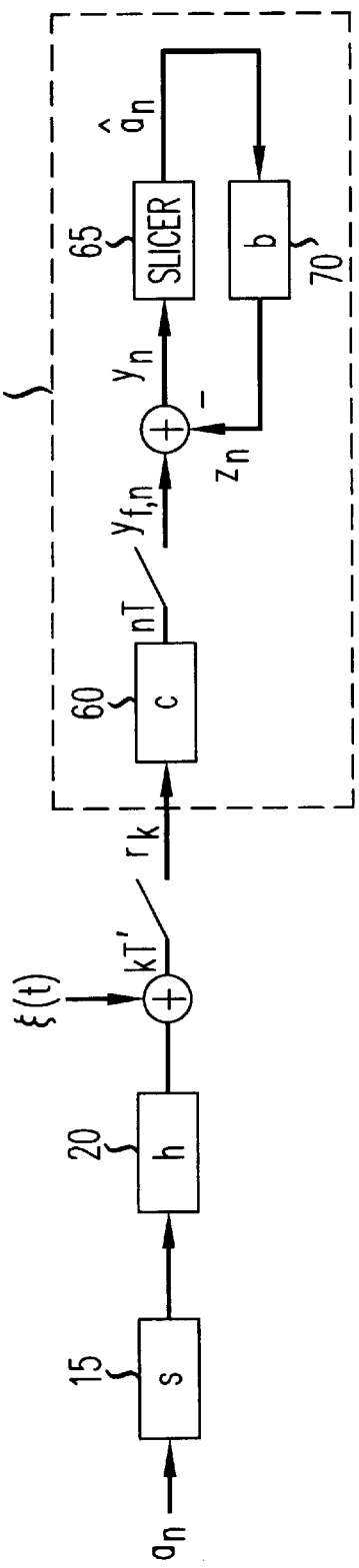
FIG. 2 is an illustrative block diagram of a prior art communications system using a decision feedback equalizer.

A typical transceiver structure is shown in FIG. 1. For simplicity, this figure and FIG. 2 show a one-dimensional transmission scheme. However, the discussion equally applies to the in-phase or quadrature signal path of a two-dimensional scheme such as CAP (Carrierless Amplitude/Phase Modulation). FIG. 1 shows a model of a communications system 10 that is disturbed by some noise $\xi(t)$. This communications system comprises shaping filter 15, communications channel 20, and linear equalizer 50. The latter comprises adaptive filter 25 and slicer 30. As known in the art, the error signal $e_n$ is used to adaptively update tap coefficients (not shown) of linear equalizer 50. In many Local Area Network (LAN), Digital Subscriber Line (DSL), and other applications, sometimes the noise, $\xi(t)$, includes one or several dominant radio frequency (RF) interferers. Unfortunately, the presence of significant RF interference degrades the performance of a receiver using a linear equalizer only.

As known in the art, the effect of RF interference is mitigated when a feedback filter is used in the equalizer. As such, in order to improve the equalization performance with RF interference, use of DFEs have been proposed by those skilled in the art. As used herein, a typical DFE is called a conventional DFE (CDFE). FIG. 2 shows an illustrative structure of a CDFE, 90, using a feed-forward filter 60 and a feedback filter 70.

In both FIGS. 1 and 2, w(t) is defined as the overall impulse response of the signal path, so that:

$$w(t) = s(t) \otimes h(t) \otimes c(t), \quad (1)$$

where $\otimes$ denotes convolution, s(t), h(t) and c(t) are the impulse responses of the shaping filter, the channel, and the filter of the equalizer, respectively. For the linear equalizer of FIG. 1, the equalizer output signal y(t) is written as $$y(t) = a(t) \otimes w(t). \quad (2)$$

In FIG. 1, a(t) represents a sequence of real symbols, $a_n$. If the output signal y(t) is sampled at time instants t=nT, then $$y_n = a_n w_0 + \sum_{m<0} a_{n-m} w_m + \sum_{m>0} a_{n-m} w_m + \xi_n. \quad (3)$$

Figure 3:
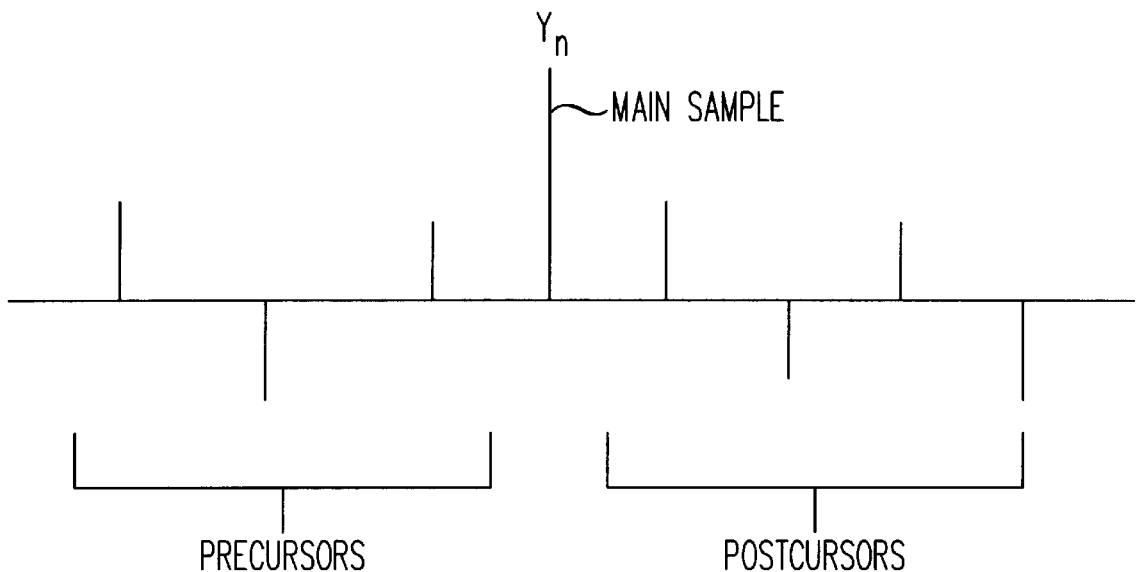
FIG. 3 is an illustrative impulse response showing precursors and postcursors.

At the sampling instant nT in equation (3), the first term represents the desired symbol, the second term involves the precursor channel symbols, the third term involves the postcursor symbols, and the last term $\xi_n$ represents an additive noise. FIG. 3 shows an interpretation of the right side of equation (3) in the time-domain of an impulse response. In the case of FIG. 2, where the equalizer incorporates a feedback filter, equation (3) is written as:

$$y_n = y_{n,f} - z_n = y_{n,f} - \sum_{m>0} \hat{a}_{n-m} w_m = \quad (4)$$

$$a_n w_0 + \sum_{m<0} a_{n-m} w_m + \sum_{m>0} (a_{n-m} - \hat{a}_{n-m}) w_m + \xi_n,$$

where an is $\hat{a}_n$ sliced symbol. Equation (4) presents a different view of the equalizer, where the output signal of the equalizer, $y_n$, is the subtraction of the output signal, $y_{n,f}$, of the feed-forward filter and the output signal, $z_n$, of the feedback filter. The right side of equation (4) means that if the prior decisions are correct, i.e., the third term $\Sigma_{m>0}(a_{n-m} - \hat{a}_{n-m}) w_m$ is equal to zero, the output signal, $y_n$, of the equalizer just needs to be determined by the current symbol $a_n w_0$, the precursor ISI, and the noise term $\xi_n$.

Figure 4:
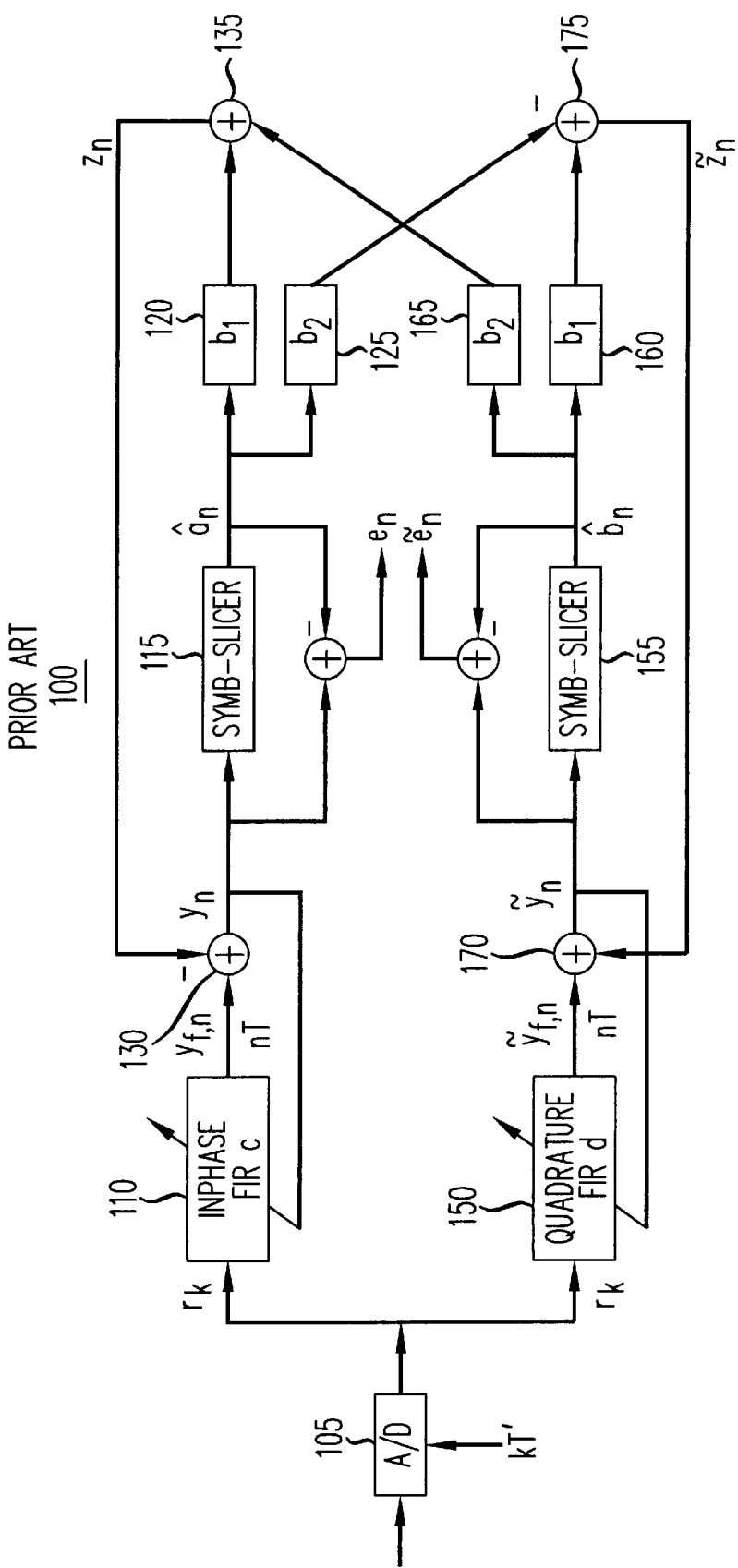
FIG. 4 is a block diagram of a prior art two-dimensional DFE.

Now, consider a cost function, as known in the art, of a CDFE. For analysis purposes, a two-dimensional CDFE, 100, which uses a phase-splitting filter structure is shown in FIG. 4. CDFE 100 comprises analog-to-digital (A/D) converter 105, inphase finite impulse response (FIR) filter 110, quadrature phase FIR filter 150, symbol-slicers 115 and 155, feedback filter 120, 125, 160 and 165, and adders 130, 135, 170, and 175.

CDFE 100 minimizes the following cost function:

$$CF = E[|Y_n - \hat{A}_n|^2], \quad (5)$$

where $\hat{A}_n$ is the complex output signal of the slicer. As shown in FIG. 4, the output signal of the equalizer, $Y_n$, consists of two components $Y_{f,n}$ and $Z_n$, $$Y_n = Y_{f,n} - Z_n, \quad (6)$$

where $Y_n = y_n + j\tilde{y}_n$, $Y_{f,n} = y_{f,n} + j\tilde{y}_{f,n}$, and $Z_n = z_n + j\tilde{z}_n$. So that the input signal of the slicer, $Y_n$, is the subtraction of the output signal, $Y_{f,n}$, of the feed-forward filter and the output signal, $Z_n$, of the feedback filter. The vectors of input signals to the feedback filter are defined as:

$$\hat{a}_n^T = [\hat{a}_{n-1}, \ldots, \hat{a}_{n-k-1}], \text{ and} \quad (7)$$

$$\hat{b}_n^T = [\hat{b}_{n-1}, \ldots, \hat{b}_{n-k-1}]. \quad (8)$$

Note, that the input signals of the feedback filter are delayed versions of the sliced symbols. Because there are two vectors of input signals, which are $\hat{a}_n$ and $\hat{b}_n$, and two feedback filter, which are $\bar{b}_{1,n}$ and $\bar{b}_{2,n}$, the following outputs result:

$$z_n = b_{1,n}^T \hat{a}_n + b_{2,n}^T \hat{b}_n, \text{ and} \quad (9)$$

$$\tilde{z}_n = b_{1,n}^T \hat{b}_n - b_{2,n}^T \hat{a}_n. \quad (10)$$

The cost function in equation (5) is suitable for the LMS algorithm. This means that good performance is achieved when correct decisions, as represented by $\hat{A}_n$, are provided.

Filter Adaptation Algorithm for a CDFE

In this section, the steady-state filter adaptation algorithms for a CDFE with the phase splitting structure shown in FIG. 4 are derived. The gradients of the cost function in equation (5) with respect to the feed-forward filter vectors $c_n$ and $d_n$ are equal to:

$$\nabla_c = 2E[e_{r,n} r_n], \text{ and} \quad (11)$$

$$\nabla_d = 2E[\tilde{e}_{r,n} r_n]. \quad (12)$$

Using these two equations in a stochastic gradient algorithm, the following tap updating algorithms for the LMS algorithm are obtained $$c_{n+1} = c_n - \mu e_n r_n = c_n - \mu(y_n - \hat{a}_n) r_n, \quad (13)$$

$$d_{n+1} = d_n - \mu \tilde{e}_n r_n = d_n - \mu(\tilde{y}_n - \hat{b}_n) r_n, \quad (14)$$

where $\mu$ is the step size for the feed-forward filter. The gradients of the cost function in equation (5) with respect to the feedback tap vectors $b_{1,n}$ and $b_{2,n}$ are equal to:

$$\nabla_{b1} = -2E[e_n \hat{a}_n + \tilde{e}_n \hat{b}_n], \text{ and} \quad (15)$$

$$\nabla_{b2} = -2E[e_n \hat{b}_n - \tilde{e}_n \hat{a}_n]. \quad (16)$$

The following tap updating algorithms for the feedback filter result:

$$b_{1,n+1} = b_{1,n} + \mu_b[e_n \hat{a}_n + \tilde{e}_n \hat{b}_n], \quad (17)$$

$$b_{2,n+1} = b_{2,n} + \mu_b[e_n \hat{b}_n - \tilde{e}_n \hat{a}_n], \quad (18)$$

where $\mu_b$ is the step size of the feedback filter, and $$e_n = y_n - \hat{a}_n \tilde{e}_n = \tilde{y}_n - \hat{b}_n. \quad (19)$$

Problems with Blind CDFE

As known in the art, it is possible to achieve promising steady-state performance with a CDFE, but one cannot guarantee good results during blind start-up. The condition to make a feedback filter converge is to make $\Sigma_{m>0}(a_{n-m} - \hat{a}_{n-m})$ converge to zero in equation (4), which can only be done when the decisions an are correct. For a CDFE, this condition cannot be satisfied during blind start-up.

Figure 5:
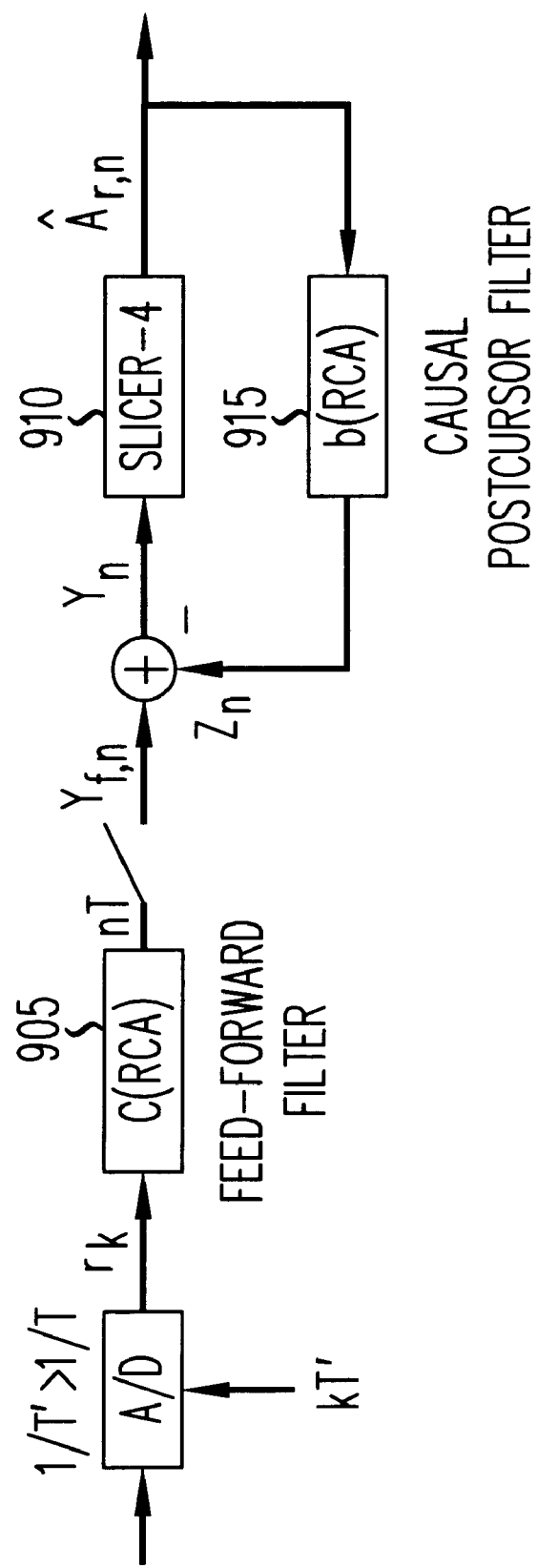
FIG. 5 is a block diagram of a prior art one-dimensional DFE during blind start-up using the RCA technique.

For example, a CDFE filter structure during blind start-up using an RCA blind start-up approach is shown in FIG. 5. (It should be noted, that complex notation is used on the signal paths of FIGS. 5, 7, 8, 9, 10, 12, and 13, to represent either one-dimensional or two-dimensional signals, e.g., $Y_{f,n}$). As is shown in FIG. 5, during blind start-up the RCA blind equalization algorithm is used for both the feed-forward filter 905 and the feed-back filter 915. A 4-point slicer, 910, is used to generate input symbols to feed-back filter 915. RCA uses the 4-point slicer to reduce the probability of wrong decisions in a statistical sense.

Using the RCA blind start-up approach, equation (4) becomes:

$$y_n - \sum_{m>0} R\mathrm{sgn}(y_n)w_0 = \qquad (20)$$
$$a_n w_0 + \sum_{m<0} a_{n-m} w_m + \sum_{m>0} (a_{n-m} - R\mathrm{sgn}(y_n))w_m + \xi_n,$$

where R is a constant used in the RCA approach (e.g., see the above-mentioned co-pending U.S. Patent application of Werner et al., Ser. No. 08/646404, filed on May 7, 1996, for a detailed description of various blind-startup approaches). As a result, referring back to FIG. 4, the cost function for the two-dimensional structure is now given by:

$$CF = E[(Y_n - R\mathrm{sgn}(Y_n))^2], \qquad (21)$$

where the output signal, $Y_n$, of the equalizer is defined in equation (6).

For a CDFE which directly uses the RCA blind algorithm, the decision symbol $\hat{a}_n$ in equation (4) is changed to the term $R\mathrm{sgn}(y_n)$ in equation (20). By doing this, the term $\Sigma_{m>0}(a_{n-m} - R\mathrm{sgn}(y_n))w_m$ in equation (20) clearly does not converge to zero when more than two values are used for the symbols $a_{n-m}$. As noted above, the 4-point slicer 910 reduces the probability of wrong decisions in a statistical sense. This helps feed-forward filter 905, but not the feedback filter 915, because the latter requires the correct input signals in order to cancel the postcursors. If the correct symbols are not fed to feedback filter 915, then error propagation occurs and both feed-forward 905 and feedback filter 915 will not converge properly.

Algorithmic Structures of a Symbol-Sliced DFE

Figure 6:
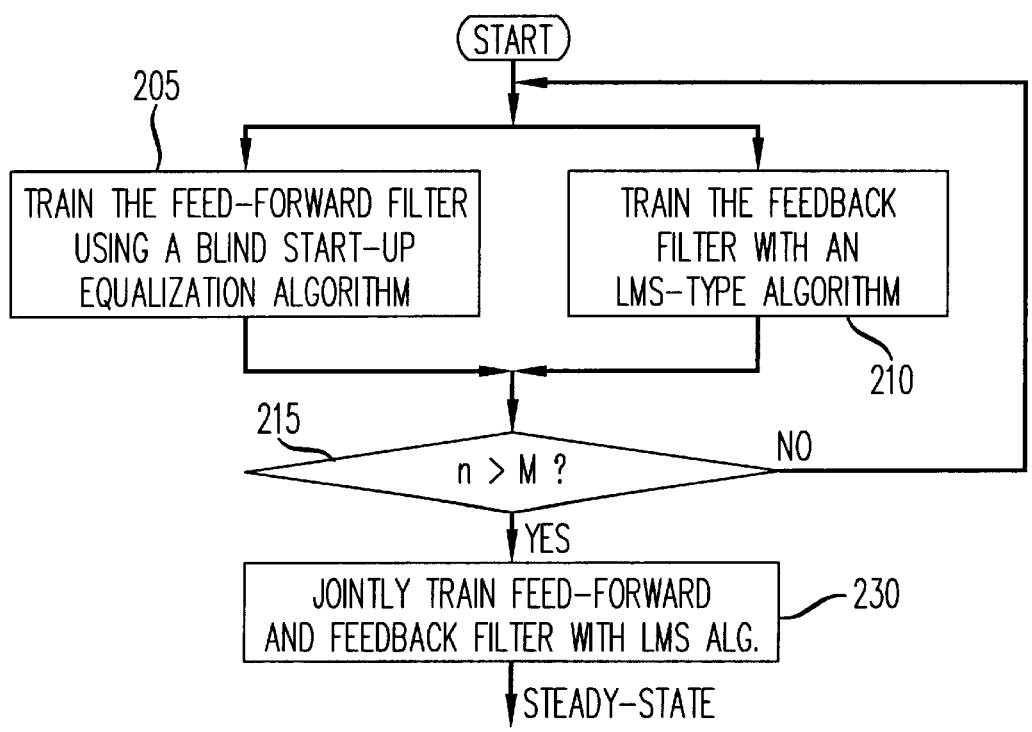
FIG. 6 is an illustrative flow chart embodying the principles of the invention.

In accordance with the inventive concept, the blind start-up difficulties of a DFE are overcome if the feed-forward filter and the feedback filter are trained separately during blind start-up. An illustrative method is shown in FIG. 6.

A blind start-up procedure using a transition algorithm can be schedule-driven, event driven, or both. With a schedule-driven approach, the switch between two different tap updating algorithms occurs after some fixed number, M, of iteratons (which can be determined by a counter, for example). With an event-driven approach, the switch occurs when a certain quality of eye opening is achieved. This can be done, for example, by continuously monitoring the MSE and making the switch when the MSE is below some threshold T. Values for M and T depend on the application and are determined experimentally. Illustratively, FIG. 6 shows a schedule-driven approach (an event-driven approach is similar and will not be described).

In step 205, the feed-forward filter is trained using a statistical-based, or blind equalization algorithm, such as RCA or MMA, which is known to work for a linear equalizer and uses statistical knowledge of the symbols. However, in step 210, the feedback filter is trained with an algorithm, such as LMS, which minimizes a cost function that is defined on the actual symbols of the signal constellation and does not use statistical knowledge of the symbols, i.e., is symbol-based.

As shown in step 215, the SDFE algorithm is used until the number of iterations, n, is greater than M. Once this condition is reached, the transition algorithm switches to using the LMS algorithm in step 230. Finally when the eye opens even more, e.g., to an MSE less than or equal to T, the receiver switches to a steady-state mode.

In accordance with the principles of the invention, a new one-dimensional CDFE is shown in FIG. 7, where a blind RCA algorithm for feed-forward filter 955 and the LMS algorithm for the feedback filter 965 are combined. With this new CDFE algorithm, the feed-forward filter 955 opens the eye with RCA, and the feedback filter 965 performs post-cursor cancellation with the LMS algorithm.

In general, the DFE in FIG. 7 during start-up is referred to herein as a symbol-sliced DFE (SDFE) because a symbol slicer is used for the feedback filter during training. This SDFE approach improves convergence performance during blind start-up. Comparing FIG. 5 and FIG. 7, the input signals to the feedback filter and the tap updating algorithms for the feedback filter are different. For the CDFE of FIG. 5, the symbols $\hat{A}_{r,n}$ are the input signals of feedback filter 915, where $\hat{A}_{r,n}$ are the outputs of 4-point slicer 910. In other words, in FIG. 5, RCA is used for the feedback filter. In contrast, for the SDFE of FIG. 7, the input signals to feedback filter 965 are the output symbols, $\hat{A}_n$, of symbol slicer 960. For a 16-CAP system, for example, this is a 16-point slicer. In FIG. 7, the LMS algorithm is used for feedback filter 965. Thus, and in accordance with the inventive concept, the feed-forward filter operates with a blind algorithm and the feedback filter operates with the LMS algorithm or symbol-based algorithm.

In accordance with the principles of the invention, several types of blind equalization algorithms can be used during blind start-up, such as RCA, CMA, and MMA. RCA is a commonly used blind equalization algorithm because it has the simplest implementation. CMA is reliable but is expensive due to the use of a rotator. MMA is a new blind algorithm that was originally proposed in above-mentioned co-pending U.S. Patent application of Werner et al. MMA provides a good compromise between cost and performance, especially for the phase-splitting filter structure.

SDFE-RCA

The SDFE in FIG. 7 is also referred to herein as an SDFE-RCA because it uses RCA as the blind equalization technique for the feed-forward filter. In FIG. 7, RCA minimizes the following cost function for the feed-forward filter:

$$CF_f = E[|Y_n - A_{r,n}|^2] = E[|Y_n - R\mathrm{sgn}(Y_n)|^2], \qquad (22)$$

where $CF_f$ refers to the cost function for the feed-forward path. The vectors of symbol-sliced inputs used for the feedback filter are given by:

$$\hat{a}_n^T = [\hat{a}_{n-1}, \ldots \hat{a}_{n-k-1}], \text{ and} \qquad (23)$$

$$\hat{b}_n^T = [\hat{b}_{n-1}, \ldots \hat{b}_{n-k-1}]. \qquad (24)$$

Because the input signals to the feedback filter are different from those of the blind CDFE, a new cost function must be developed. As shown in FIG. 7, the LMS algorithm is used as the tap adaptation algorithm for the feedback filter. As known in the art, the cost function of the LMS algorithm is:

$$CF_b = E[|Y_n - \hat{A}_n|^2], \qquad (25)$$

where $CF_b$ refers to the cost function for the feedback filter.

SDFE-MMA

Turning to FIG. 8, another variation of an SDFE is shown, herein referred to as an SDFE-MMA in which the MMA blind equalization algorithm is used for the feed-forward filter during blind start-up. FIG. 8 shows the block diagram of an SDFE-MMA filter structure. With MMA, the algorithm minimizes the following cost function:

$$CF_f = E[(y_n^2-R^2)^2+(\tilde{y}_n^2-R^2)^2], \quad (26)$$

where $$R^2 = \frac{E[a_n^4]}{E[a_n^2]}.$$

(A detailed study of MMA is found in the above-mentioned co-pending U.S. patent application of Werner et al.) Like SDFE-RCA, the inputs to the feedback filter are the outputs of the symbol slicer, as defined in equations (23) and (24). However, the tap adaptation algorithm for the feedback filter is different from SDFE-RCA. Unlike RCA, which is a second-order algorithm, MMA is a fourth-order statistical algorithm. However, LMS is a second-order algorithm. In order to achieve similar convergence rates, it is desirable to adjust the LMS algorithm to a fourth-order algorithm. The cost function for the feedback filter is correspondingly adjusted to a fourth-order cost function referring to the sliced symbols. In accordance with the inventive concept, it is given by:

$$CF_b = E[(y_n^2-\hat{a}_n^2)^2+(\tilde{y}_n^2-\hat{b}_n^2)^2]. \quad (27)$$

As used herein, equation (27) is referred to as a generalized fourth-order LMS algorithm (GLMS-4). As shown in FIG. 8, MMA is used for the feed-forward filter and the GLMS-4 algorithm is used for the feedback filter.

Figure 9:
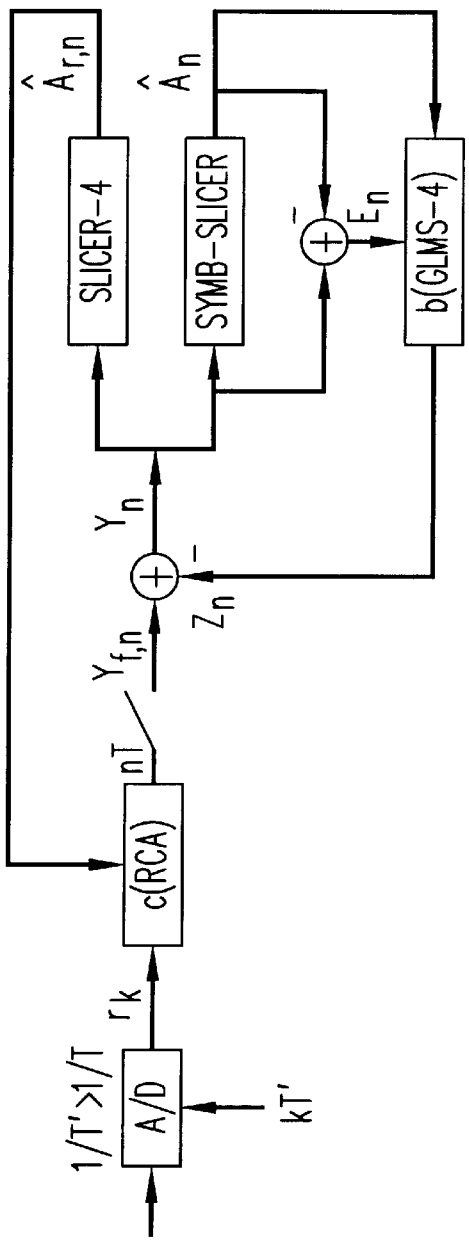
Figure 10:
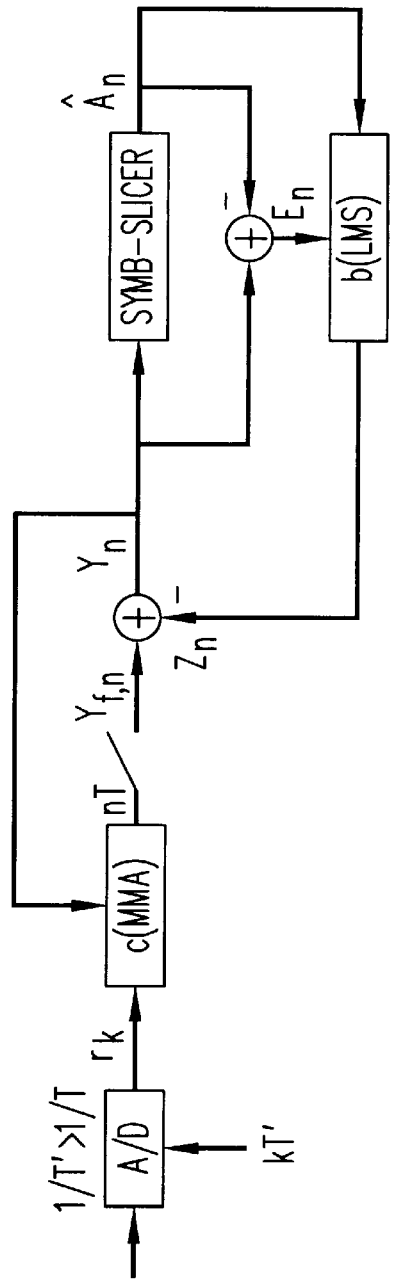

Other embodiments of the inventive concept are possible, as illustrated in FIGS. 9 and 10. In FIG. 9, RCA is used for the feed-forward filter and the GLMS-4 for the feedback filter, and in FIG. 10, MMA is used for the feed-forward filter and the LMS algorithm for the feedback filter. FIGS. 9 and 10 provide alternative embodiments that are easier to implement. However, SDFE-RCA and SDFE-MMA shown in FIGS. 7 and 8 are recommended because of convergence rate considerations mentioned earlier. (Note, if CMA is used for the feed-forward filter, e.g., in FIG. 10, a rotator must be added after the feed-forward filter).

The inventive concept is equally applicable to noise predictive decision feedback equalizers (NPDFE). As described further below, a new NPDFE with sliced symbols for the feedback filter is referred to herein as an SNPDFE. For simplicity, only the cost functions and filter adaptation algorithms are provided below.

SNPDFE-RCA

Figure 11:
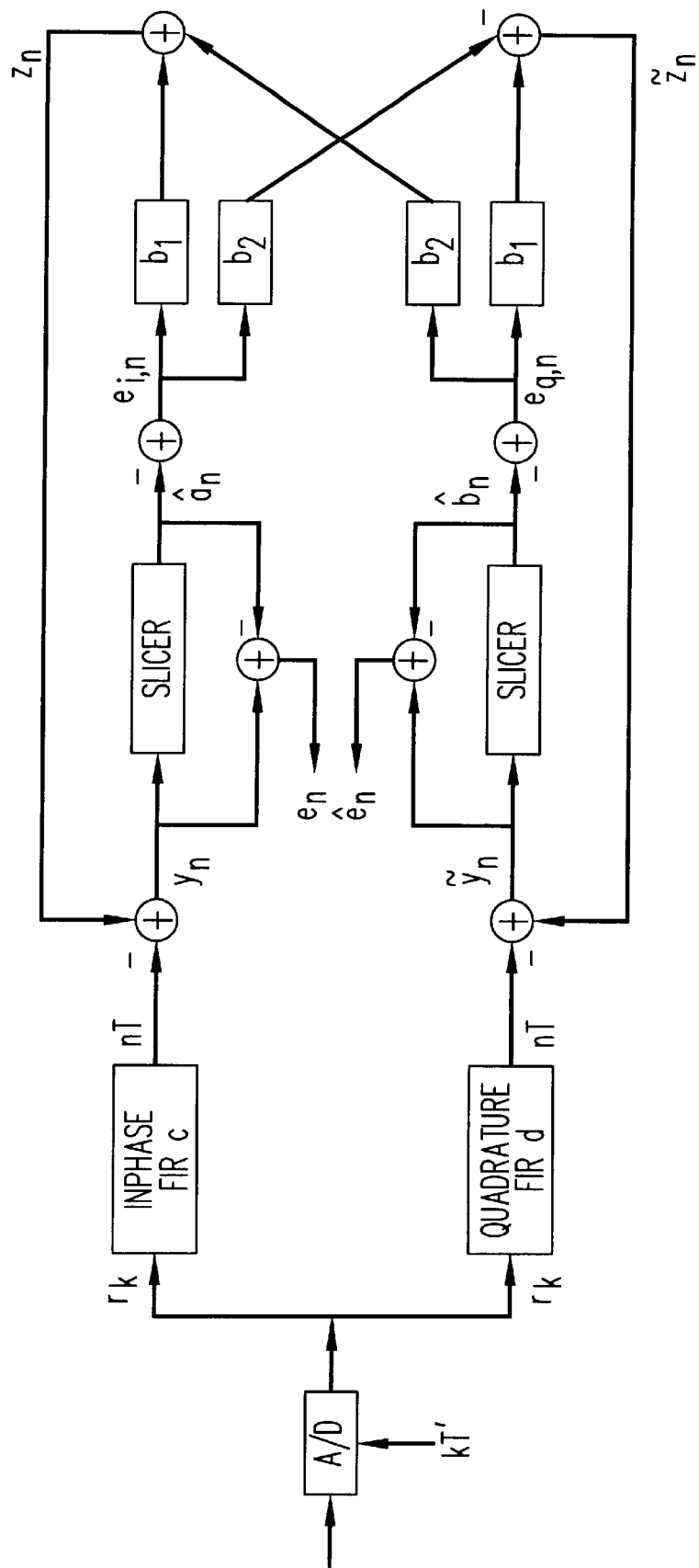
FIG. 11 is a block diagram of a prior art phase-splitting noise predictive decision feedback equalizer (NPDFE)

For reference purposes, FIG. 11 shows a prior art NPDFE that uses a phase-splitting structure. In accordance with the invention, FIG. 12 shows the structure of a SNPDFE second-order algorithm, referred to herein as SNPDFE-RCA. The cost function for the feed-forward filter in FIG. 12 is as follows:

$$CF_f = E[|Y_{f,n}-Rsgn(y_{f,n})|^2]. \quad (28)$$

The inputs to the feedback filter are given by the subtraction between the equalizer outputs $Y_{f,n}$ and slicer outputs $A_n$:

$$\hat{e}_{i,n}^T = [\hat{a}_{n-1}-y_{n-1}, \ldots, \hat{a}_{n-k-1}-y_{n-k-1}], \text{ and} \quad (29)$$

$$\hat{e}_{q,n}^T = [\hat{b}_{n-1}-\tilde{y}_{n-1}, \ldots, \hat{b}_{n-k-1}-\tilde{y}_{n-k-1}]. \quad (30)$$

The cost function for the feedback filter is the same as given in equation (25). With the input vectors defined in equations (29) and (30), the input signals of the slicer in equation (25) are given by:

$$y_n = y_{f,n} - z_n = y_{f,n} - (b_{1,n}e_{i,n}+b_{2,n}e_{q,n}), \text{ and} \quad (31)$$

$$\tilde{y}_n = \tilde{y}_{f,n} - \tilde{z}_n = \tilde{y}_{f,n} - (b_{1,n}e_{q,n}-b_{2,n}e_{i,n}) \quad (32)$$

SNPDFE-MMA

FIG. 13 shows a structure of an SNPDFE fourth-order algorithm, referred to herein as SNPDFE-MMA. The input signals to the feedback filter are the same as those for SNPDFE-RCA which are given in equations (29) and (30). However, the cost function for both the feed-forward filter and the feedback filter are different. For the feed-forward filter, the cost function is:

$$CF_f = E[(y_{f,n}^2-R^2)^2+(\tilde{y}_{f,n}^2-R^2)^2]. \quad (33)$$

The cost function for the feedback filter is the same as that for SDFE-MMA defined in equation (27) with the input signals to the feedback filter given in equations (29) and (30) and the input signals of the slicer calculated in equations (31) and (32).

Filter Adaptation

In this section, the tap updating algorithms are presented. For simplicity, only two variations of SDFE are described.

SDFE-RCA

For SDFE-RCA, the standard RCA blind equalization technique is used for the feed-forward filter. The cost function of RCA is shown in equation (22) and the tap updating algorithms for the in-phase tap vector $c_n$ and quadrature tap vector $d_n$ are:

$$c_{n+1} = c_n - \mu(y_n-Rsgn(y_n))r_n, \quad (34)$$

$$d_{n+1} = d_n - \mu(\tilde{y}_n-Rsgn(\tilde{y}_n))r_n, \quad (35)$$

The cost functions of SDFE is different from that of blind CDFE. For the feedback filter, the cost function of SDFE is defined in equation (25) that is the same as the LMS algorithm. The tap updating algorithms are given by:

$$b_{1,n+1} = b_{1,n} + \mu_b((y_n-\hat{a}_n)\hat{a}_n+(\tilde{y}_n-\hat{b}_n)\hat{b}_n) \quad (36)$$

$$b_{2,n+1} = b_{2,n} + \mu_b((y_n-\hat{a}_n)\hat{b}_n)-(\tilde{y}_n-\hat{b}_n)\hat{a}_n), \quad (37)$$

where the vectors $\hat{a}_n$ and $\hat{b}_n$ are defined in equations (23) and (24).

SDFE-MMA

The tap updating algorithms for SDFE-MMA are now derived. As described above, an illustrative structure for an SDFE-MMA is shown in FIG. 8. Again, MMA is used for the feed-forward filter. The tap updating algorithms for the MMA cost function are given by:

$$c_{n+1} = c_n - \mu y_n(y_n^2-R^2)r_n, \text{ and} \quad (38)$$

$$d_{n+1} = d_n - \mu \tilde{y}_n(\tilde{y}_n^2-R^2)r_n. \quad (39)$$

With SDFE-MMA, the input signals to the feedback filter are the same as those used for SDFE-RCA. However, in order to make the convergence rate consistent in the system, the LMS algorithm is modified to a fourth-order LMS algorithm, as given in equation (27). The gradients of the cost function in equation (27) with respect to the feedback tap vectors $b_{1,n}$ and $b_{2,n}$ are equal to:

$$\frac{\partial CF_b}{\partial b_1} = -4E\left[(y_n^2 - \hat{a}_n^2)y_n\hat{a}_n + \left(\tilde{y}_n - \hat{b}_n^2\right)\tilde{y}_n\hat{b}_n\right], \text{ and} \quad (40)$$

$$\frac{\partial CF_b}{\partial b_2} = -4E\left[(y_n^2 - \hat{a}_n^2)y_n\hat{b}_n - \left(\tilde{y}_n^2 - \hat{b}_n^2\right)\tilde{y}_n\hat{a}_n\right]. \quad (41)$$

The taps are updated in the opposite direction of the gradients. As a result, the following tap updating algorithms are obtained:

$$b_{1,n+1} = b_{1,n} + \mu_b[(y_n^2 - \hat{a}_n^2)y_n\hat{a}_n + (\tilde{y}_n^2 - \hat{b}_n^2)\tilde{y}_n\hat{b}_n], \text{ and} \quad (42)$$

$$b_{2,n+1} = b_{2,n} + \mu_b[(y_n^2 - \hat{a}_n^2)y_n\hat{b}_n - (\tilde{y}_n^2 - \hat{b}_n^2)\tilde{y}_n\hat{a}_n]. \quad (43)$$

SNPDFE-RCA

For the cost function in equation (28), the filter adaptation algorithms for the feed-forward filter are derived as:

$$c_{n+1} = c_n - \mu(y_{f,n} - R\text{sgn}(y_{f,n}))r_n, \text{ and} \quad (44)$$

$$d_{n+1} = d_n - \mu(\tilde{y}_{f,n} - R\text{sgn}(\tilde{y}_{f,n}))r_n. \quad (45)$$

For the cost function of equation (25) and definitions shown in equations (31) and (32), the adaptation algorithms for the feedback filter are the following:

$$b_{1,n+1} = b_{1,n} + \mu_b((y_n - \hat{a}_n)\hat{e}_{i,n} + (\tilde{y}_n - \hat{b}_n)\hat{e}_{q,n}), \text{ and} \quad (46)$$

$$b_{2,n+1} = b_{2,n} + \mu_b((\tilde{y}_n - \hat{b}_n)\hat{e}_{i,n} - (y_n - \hat{a}_n)\hat{e}_{q,n}), \quad (47)$$

where the vectors $\hat{e}_{i,n}$ and $\hat{e}_{q,n}$ are defined in equations (29) and (30).

SNPDFE-MMA

For the cost function shown in equation (33), the filter adaptation algorithms for the feed-forward filter are given as:

$$c_{n+1} = c_n - \mu y_{f,n}(y_{f,n}^2 - R^2)r_n, \text{ and} \quad (48)$$

$$d_{n+1} = d_n - \mu \tilde{y}_{f,n}(\tilde{y}_{f,n}^2 - R^2)r_n. \quad (49)$$

For the cost function shown in equation (27) and the definitions shown in equations (31) and (32), the updating algorithms for the feedback filter are derived as:

$$b_{1,n+1} = b_{1,n} + \mu_b[(y_n^2 - \hat{a}_n^2)y_n\hat{e}_{i,n} + (\tilde{y}_n^2 - \hat{b}_n^2)\tilde{y}_n\hat{e}_{q,n}], \text{ and} \quad (50)$$

$$b_{2,n+1} = b_{2,n} + \mu_b[(\tilde{y}_n^2 - \hat{b}_n^2)\tilde{y}_n\hat{e}_{i,n} - (y_n^2 - \hat{a}_n^2)y_n\hat{e}_{q,n}]. \quad (51)$$

As described above, a new DFE algorithm, referred to herein as symbol-sliced DFE (SDFE), is used to improve blind equalization. With SDFE, the feed-forward filter uses a blind equalization algorithm and the feedback filter uses a symbol-based algorithm. The combined use of blind and symbol-based algorithm leads to an improvement in blind equalization.

Figure 14:
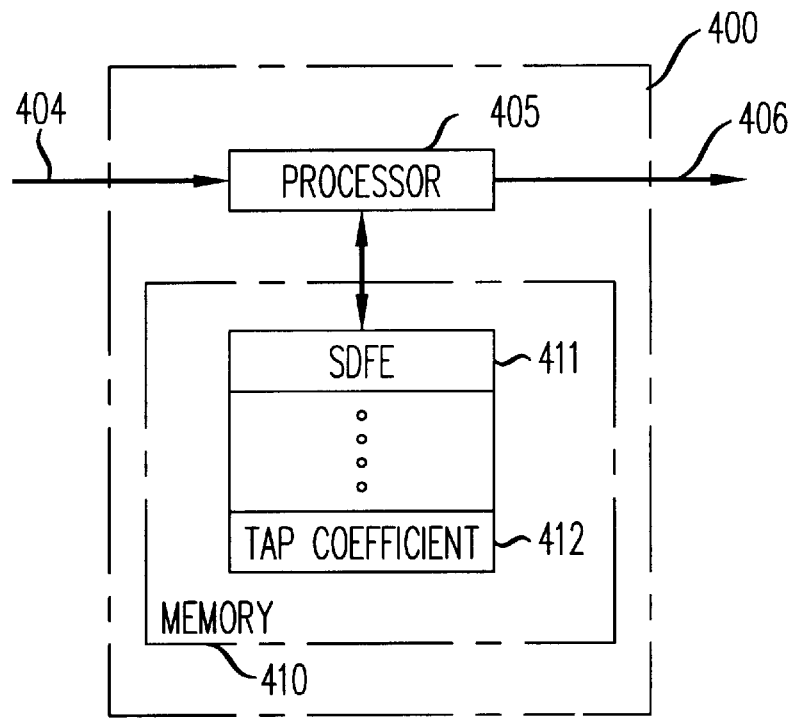
FIGS. 14 and 15 are illustrative block diagrams of a portion of a receiver embodying the principles of the invention.
Figure 15:
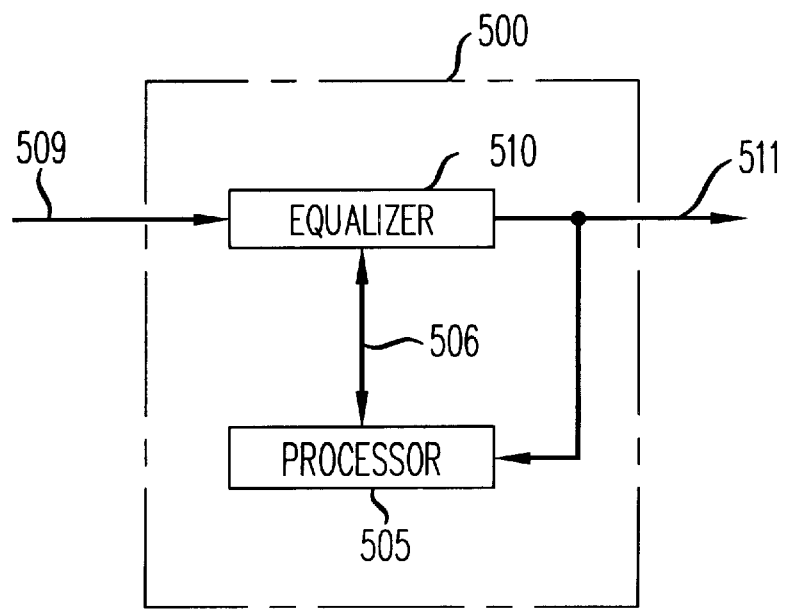

Illustrative embodiments of the inventive concept are shown in FIGS. 14 and 15. FIG. 14 illustrates an embodiment representative of a digital signal processor 400 that is programmed to implement a DFE in accordance with the principles of the invention. Digital signal processor 400 comprises a central processing unit (processor) 405 and memory 410. A portion of memory 410 is used to store program instructions that, when executed by processor 405, implement the SDFE-type operation. This portion of memory is shown as 411. Another portion of memory, 412, is used to store tap coefficient values that are updated by processor 405 in accordance with the inventive concept. It is assumed that a received signal 404 is applied to processor 405, which equalizes this signal in accordance with the inventive concept to provide a output signal 406. For the purposes of example only, it is assumed that output signal 406 represents a sequence of output samples of a decision feedback equalizer. (As known in the art, a digital signal processor may, additionally, further process received signal 404 before deriving output signal 406.) An illustrative software program is not described herein since, after learning of the inventive concept as illustrated by the flow chart of FIG. 6, such a program is within the capability of one skilled in the art. Also, it should be noted that any equalizer structures, such as those described earlier, can be implemented by digital signal processor 400 in accordance with the inventive concept.

FIG. 15 illustrates another alternative embodiment of the inventive concept. Circuitry 500 comprises a central processing unit (processor) 505, and an equalizer 510. The latter is illustratively assumed to be a DFE. It is assumed that equalizer 510 includes at least two tap-coefficient register for storing values for corresponding tap coefficient vectors in the feed-forward and feedback fillers. Processor 505 includes memory, not shown, similar to memory 410 of FIG. 14 for implementing the SDFE-type algorithms. Equalizer output signal 511, which represents a sequence of equalizer output samples, is applied to processor 505. The latter analyzes equalizer output signal 511, in accordance with the inventive concept, to adapt values of the tap coefficients in such a way as to converge to a correct solution.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., an equalizer, etc., the functions of any one or more of those building blocks can be carried out using one or more appropriate programmed processors.

What is claimed:

1. A method for blindly converging an equalizer having a feed-forward portion and a feedback portion, the method comprising the steps of:

using a statistical-based equalization technique for converging the feed-forward portion and using a symbol-based equalization technique for converging the feedback portion;

wherein the statistical-based equalization technique is based on a multimodulus algorithm (MMA).

2. The method of claim 1 wherein the symbol-based equalization technique is based on a least-mean square (LMS) algorithm.

3. The method of claim 1 wherein the symbol-based equalization technique is based on a fourth-order least-mean square (LMS) algorithm.

4. A method for converging an equalizer having a feed-forward portion and a feedback portion, the method comprising the steps of:

generating a signal as a function of output signals of the feed-forward portion and the feedback portion;

symbol slicing the generated signal for generating a first sequence of symbols taken from a constellation comprising N symbols;

symbol slicing the generated signal for generating a second sequence of symbols taken from a constellation having M symbols, where N<M;

using values of the first sequence of symbols for converging the feed-forward portion; and using values of the second sequence of symbols for converging the feedback portion.

5. The method of claim 4 wherein the step of using values for converging the feed-forward portion includes the step of operating on these values in accordance with a reduced constellation-based algorithm (RCA).

6. The method of claim 4 wherein the step of using values for converging the feedback portion includes the step of operating on these values in accordance with a least-mean square (LMS)-based algorithm.

7. The method of claim 4 wherein the step of using values for converging the feedback portion includes the step of operating on these values in accordance with a fourth-order least-mean square (LMS)-based algorithm.

8. A method for blindly converging a decision feedback equalizer having a feed-forward portion and a feedback portion, the method comprising the steps of:

generating a signal as a function of output signals of the feed-forward portion and the feedback portion;

symbol slicing the generated signal for generating a sequence of symbols taken from a constellation having M symbols;

using the generated signal as a feedback signal for converging the feed-forward portion; and using values of the sequence of symbols for converging the feedback portion;

wherein the step of using the generated signal for converging the feed-forward portion includes the step of using a multimodulus-based algorithm (MMA).

9. The method of claim 8 wherein the step of using values for converging the feedback portion includes the step of operating on these values in accordance with a least-mean square (LMS)-based algorithm.

10. The method of claim 8 wherein the step of using values for converging the feedback portion includes the step of operating on these values in accordance with a fourth-order least-mean square (LMS)-based algorithm.

11. Apparatus comprising:

memory for storing program data and tap coefficients for use in a feed-forward filter and a feedback filter; and a processor for executing the stored program for blindly converging the values of the tap coefficients for a) the feed-forward filter by using a statistical-based blind equalization technique, b) the feedback filter by using a symbol-based equalization technique;

wherein the statistical-based equalization technique is based on a multimodulus algorithm (MMA).

12. The apparatus of claim 11 wherein the symbol-based equalization technique is based on a least-mean square (LMS) algorithm.

13. The apparatus of claim 11 wherein the symbol-based equalization technique is based on a fourth-order least-mean square (LMS) algorithm.

14. Apparatus comprising:

a feedback filter;

a feed-forward filter;

an N-symbol slicer operative on an applied signal, which is developed as a function of output signals from the feedback filter and the feed-forward filter, for generating a first sequence of symbols taken from a constellation comprising N symbols;

an M-symbol slicer operative on the applied signal for generating a second sequence of symbols taken from a constellation having M symbols, where N<M;

wherein the feed-forward filter adapts as a function of values of the first sequence of symbols and the feedback filter adapts as a function of values of the second sequence of symbols.

15. The apparatus of claim 14 wherein the feed-forward filter adapts as a function of a blind equalization algorithm and the feedback filter adapts as a function of a symbol-based algorithm.

16. The apparatus of claim 15 wherein the symbol-based algorithm is a least-mean square (LMS)-based algorithm.

17. The apparatus of claim 15 wherein the symbol-based algorithm is a fourth-order least-mean square (LMS)-based algorithm.

18. The apparatus of claim 14 wherein the feed-forward filter and the feedback filter form a decision feedback equalizer.

19. The apparatus of claim 14 wherein the feed-forward filter and the feedback filter form a noise predictive decision feedback equalizer.

* * * * *